(12) United States Patent
Mink et al.

(10) Patent No.: US 11,412,655 B2
(45) Date of Patent: Aug. 16, 2022

(54) ERGONOMIC TRIMMERS HAVING HIGH OPERATIONAL SAFETY

(71) Applicant: Globe (Jiangsu) Co., Ltd., Jiangsu (CN)

(72) Inventors: Anke Mink, Joenkoeping (SE); Alexander Tyrling, Joenkoeping (SE)

(73) Assignee: Globe (Jiangsu) Co., Ltd., Jiangsu (CN)

( * ) Notice: Subject to any disclaimer, the term of this patent is extended or adjusted under 35 U.S.C. 154(b) by 400 days.

(21) Appl. No.: 16/615,067

(22) PCT Filed: Sep. 27, 2017

(86) PCT No.: PCT/CN2017/103731
§ 371 (c)(1),
(2) Date: Nov. 19, 2019

(87) PCT Pub. No.: WO2019/061086
PCT Pub. Date: Apr. 4, 2019

(65) Prior Publication Data
US 2020/0163276 A1    May 28, 2020

(51) Int. Cl.
*A01D 34/416*    (2006.01)
*A01D 101/00*    (2006.01)

(52) U.S. Cl.
CPC ........ *A01D 34/416* (2013.01); *A01D 2101/00* (2013.01)

(58) Field of Classification Search
None
See application file for complete search history.

(56) References Cited

U.S. PATENT DOCUMENTS 4,761,939 A * 8/1988 Zerrer ................... A01D 34/90
                                                        56/DIG. 18
4,829,675 A * 5/1989 Beihoffer ............. A01D 34/822
                                                        403/311
(Continued)

FOREIGN PATENT DOCUMENTS

CN      205884000 U    1/2017
DE      20003425 U1    9/2000
(Continued)

OTHER PUBLICATIONS

European Supplemental Search Report in related European Patent Application No. 17927215.8 (EP3595430) dated Mar. 10, 2020; 4 pages.

(Continued)

*Primary Examiner* — Hwei-Siu C Payer
(74) *Attorney, Agent, or Firm* — Rooney IP, LLC

(57) ABSTRACT

A trimmer which is suitable for cutting vegetation such as plants, bushes, hedges and trees. The trimmer includes a motor housing, a shaft tube enclosing a drive shaft, a front handle provided at the shaft tube, an electric motor as well as a cutting unit. The shaft tube which carries the front handle includes a portion which has a smaller diameter than the rest of the shaft tube. The trimmer is ergonomic and has higher operational safety than conventional trimmers. Moreover, the shaft tube, and drive shaft enclosed within the shaft tube, can't be crushed by compressive forces.

20 Claims, 2 Drawing Sheets

(56) References Cited

U.S. PATENT DOCUMENTS

| | | | | |
|---|---|---|---|---|
| 5,661,960 | A | * | 9/1997 | Smith .................. A01D 34/902 56/DIG. 18 |
| 5,662,428 | A | * | 9/1997 | Wilson .................... B25G 1/04 403/374.5 |
| 6,006,434 | A | * | 12/1999 | Templeton .............. A01D 34/90 30/296.1 |
| 7,382,104 | B2 | * | 6/2008 | Jacobson ............. A01D 34/902 30/296.1 |
| 8,667,648 | B2 | * | 3/2014 | Vierck ................... B25F 5/026 30/296.1 |
| 2006/0123635 | A1 | * | 6/2006 | Hurley ................ A01D 34/902 30/276 |
| 2007/0068008 | A1 | * | 3/2007 | Wu ...................... A01D 34/416 30/298 |
| 2007/0095792 | A1 | | 5/2007 | Kremsler et al. |
| 2008/0236124 | A1 | | 10/2008 | Heinzelmann |
| 2009/0188354 | A1 | * | 7/2009 | Harris ................. A01D 34/902 172/14 |
| 2010/0313429 | A1 | * | 12/2010 | Yamaoka ............... A01D 34/90 30/277.4 |
| 2012/0227270 | A1 | | 9/2012 | Ito et al. |
| 2015/0083452 | A1 | * | 3/2015 | Rader .................. A01D 34/902 239/722 |
| 2016/0345492 | A1 | | 12/2016 | Miller et al. |
| 2019/0110396 | A1 | * | 4/2019 | Bringhurst ........... A01D 34/416 |
| 2020/0163276 | A1 | * | 5/2020 | Mink .................... A01D 75/20 |

FOREIGN PATENT DOCUMENTS

| | | |
|---|---|---|
| DE | 10045598 A1 | 3/2002 |
| DE | 102007015680 A1 | 10/2008 |
| EP | 2510773 A1 | 10/2012 |
| EP | 2779820 A1 | 9/2014 |

OTHER PUBLICATIONS

Search Report and Written Opinion in related International Patent Application No. PCT/US2017/103731 dated Jun. 28, 2018; 6 pages.

* cited by examiner

ERGONOMIC TRIMMERS HAVING HIGH OPERATIONAL SAFETY

TECHNICAL FIELD

The present invention relates generally to ergonomic string trimmers, pole hedge trimmers and pole saws which have high operational safety.

BACKGROUND ART

Examples of a prior art string trimmer, pole hedge trimmer and pole saw is disclosed in U.S. Pat. Nos. 4,860,451, 8,186,066 and EP2615904, respectively. However, U.S. Pat. Nos. 4,860,451, 8,186,066 and EP2615904 are silent about operational safety and the ergonomics of trimmers.

There are thousands of people treated in hospitals for trimmer injuries every year. A majority of the injuries are (i) lacerations to the fingers, hands, and legs and foreign objects, as well as (ii) lacerations and contusions to the eyes. In a scientific study published in Journal of Safety Research, it is indicated that an estimated 81,907 injuries involving a lawn trimmer occurred from 2000-2009 in the USA [1]. The incidence generally increased over time. Lawn trimmers are also referred to as string trimmers and grass trimmers in the art. The most commonly injured body part was the head, specifically the eye, accounting for 42.5% of the injuries. Contusions and abrasions were the most common type of injury to the head, but lacerations were the most common injury to the extremities, and strains/sprains were the most common injury to the trunk. Similar accidents have also been reported for pole hedge trimmers and pole saws in other sources. Hence, there is a need for reducing injuries caused by trimmers.

The solution typically provided for reducing injures and extent of damage by lacerations is (i) awareness training, (ii) first aid training, and (iii) to use personal protective equipment. Examples of protective wear for trimmer users is disclosed in U.S. Pat. No. 5,987,778. However, training and protective equipment does not provide a safer trimmer. Moreover, training and protective equipment does not provide a trimmer which is safe to use when the user is fatigued. Hence, there is a need for safer trimmer, i.e. there is e need for a trimmer with high operation safety. Moreover, there is also a need for trimmer which does not give rise to fatigue and discomfort, i.e. there is a need for an ergonomic trimmer.

As indicated in the scientific study in Journal of Safety Research mentioned earlier, the incidence of trimmer accidents generally increased over time. One of the reasons for the increase of accidents might be that the dimension of the shaft tubes and drive shafts of trimmers have changed over time and are in the present almost over-dimensioned, i.e. shaft tubes and drive shafts are not only longer, but are also have a bigger diameter in trimmers sold today compared with trimmer sold previously.

Proportions of length, width and strength is critical for the shaft tube. If the shaft tube and drive shaft of a trimmer have no lateral support (i.e. if the diameter is not big enough), then it is most likely that the shaft tube and drive shaft will be crushed by compressive forces. Moreover, the strength or width requirements grow exponentially with increase of the extension length of the shaft tube. Hence, shaft tubes and drive shafts are both longer and have a bigger diameter in trimmers sold today since users desire longer trimmers (e.g. to be able to reach vegetation at high heights). Furthermore, users also desire more powerful trimmers, and as a consequence, shaft tubes and drive shafts have evolved to become wider (i.e. higher diameter) and thereby stronger.

The problem with wide shaft tubes is that users can't get a good grip of the handle which enclose the shaft tube since the handles have a big diameter (i.e. the width/diameter of the handle is proportional to the diameter of the shaft tube). This results in the handle easily slipping out of the user's hand, especially when the user feels discomfort or is fatigued. Interestingly, the discomfort and fatigue is most often caused by the user not being able to properly grab the handle. Unfortunately, the trimmer which slips out of the hand can injure the user or a nearby person or object. Injured objects are dangerous since they can fly into the body parts (such as the eye) of the user or a person standing nearby. Hence, there is a need for a trimmer, having a handle enclosing the shaft tube, which has (i) an ergonomic handle, i.e. a handle which provides a good grip and doesn't cause discomfort and fatigue, (ii) a strong shaft tube, i.e. a shaft tube which can't be crushed by compressive forces, as well as (iii) high operational safety.

OBJECT OF THE INVENTION

An object of the present invention is to provide an ergonomic trimmer.

A further object of the invention is to provide a safe operation of the trimmer.

A further object of the invention is to provide a trimmer that doesn't give rise to fatigue and/or discomfort to the hand which is holding a handle at the shaft tube.

A further object of the invention is to provide a trimmer which has a shaft tube, and drive shaft enclosed within the shaft tube, which can't be crushed by compressive forces.

A further object of the invention is to provide a trimmer which has (i) an ergonomic handle, (ii) a strong shaft tube which can't be crushed by compressive forces, and (iii) high operational safety.

A further object of the invention is to maximize the productivity of the trimmer.

SUMMARY OF INVENTION

The objects of the invention are attained by the invention disclosed in the claims.

A preferred embodiment of the invention relates to an ergonomic trimmer suitable for cutting vegetation comprising:
 a motor housing,
 a shaft tube enclosing a drive shaft,
 front handle being provided at the shaft tube, proximate the motor housing,
 an electric motor, and
 a cutting unit,
 characterized in that a part of the shaft tube which carries the front handle comprises a portion which has a smaller diameter than the rest of the shaft tube. The portion which has a smaller diameter is from now on referred to as the "smaller diameter shaft tube portion".

In a further embodiment, the smaller diameter shaft tube portion can have a length ranging from 3 cm to 20 cm, preferably 5 cm to 18 cm, more preferably 7 cm to 15 cm, and most preferably 9 cm to 13 cm.

In a further embodiment, the diameter of the smaller diameter shaft tube portion may have a diameter ranging from 14 mm to 50 mm, preferably 20 mm to 30 mm, more preferably 22 to 28 mm, and most preferably about 24 mm to 26 mm.

In a further embodiment, the rest of the shaft tube has a diameter which is at least 1 mm bigger than the diameter of the smaller diameter shaft tube portion (15), preferably 1.5 mm to 2 mm bigger, more preferably 2.1 mm to 2.5 mm bigger, most preferably 2.6 to 3.0 mm bigger.

In a further embodiment, the diameter of the part of the front handle which encloses the smaller diameter shaft tube portion has a diameter which is at least 0.1 mm bigger than the diameter of the smaller diameter shaft tube portion, preferably 1 mm to 10 mm bigger, more preferably 2 mm to 7 mm bigger, most preferably 3 mm to 5 mm bigger.

In a further embodiment, the cutting unit comprises the cutting mechanism of a pole hedge trimmer, a string trimmer or a pole saw.

In a further embodiment, the trimmer is a pole hedge trimmer, a string trimmer or a pole saw.

In a further embodiment, the shaft tube is made of one part.

In a further embodiment, the shaft tube is a non-telescoping shaft tube.

In a further embodiment, the trimmer comprises a loop handle (20), a J-handle, trigger and/or shield.

In a further embodiment, the electric motor is powered by a battery pack, fuel-cell, solar panel and/or power cord.

BRIEF DESCRIPTION OF DRAWINGS

The invention is now described, by way of example, with reference to the accompanying drawings, in which.

DESCRIPTION OF EMBODIMENTS

Figure 1:
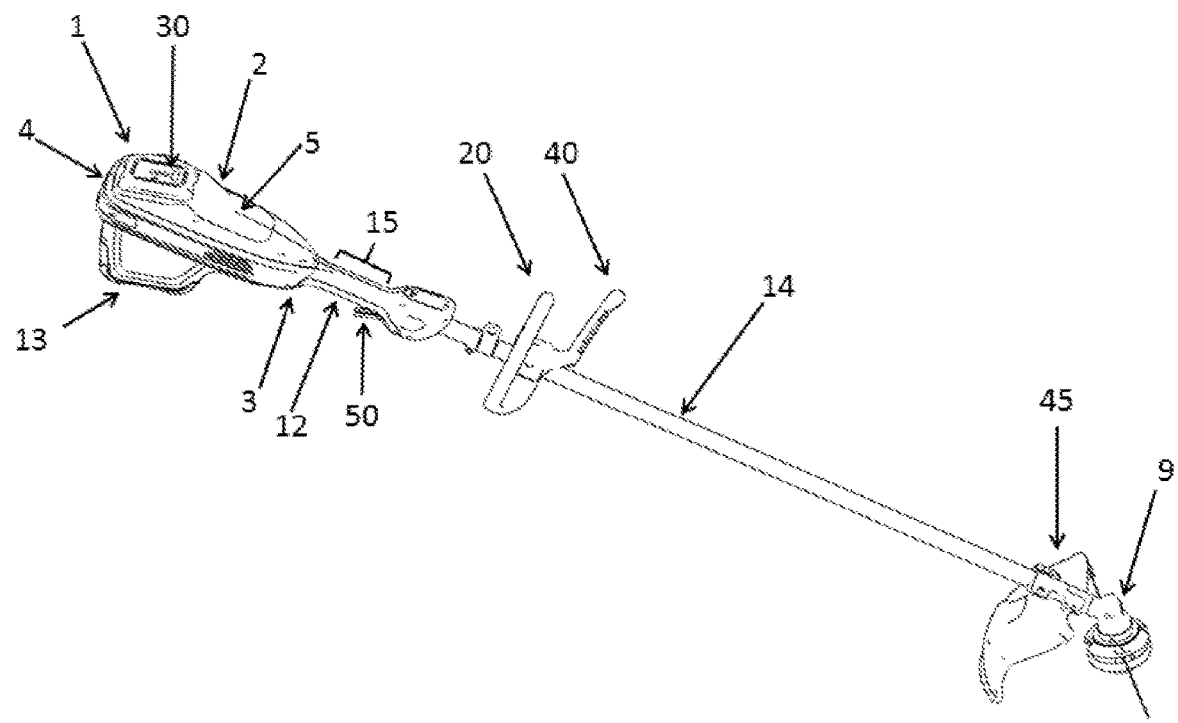
FIG. 1 is a perspective view of the trimmer according to the present invention.

The present invention relates to a trimmer which is suitable for cutting vegetation such as grass, lawn, plants, bushes, hedges and trees. The trimmer is ergonomic and has higher operational safety than conventional trimmers. Moreover, the shaft tube, and drive shaft enclosed within the shaft tube, can't be crushed by compressive forces.

The term ergonomic trimmer is used in the present invention to define a trimmer which has design and configuration features, which when the trimmer is used, will maximize productivity by minimizing operating fatigue and discomfort.

The trimmer may be a string trimmer, pole hedge trimmer or pole saw.

A string trimmer, also called "weed-whip", "whippersnipper", "weed-whacker", "weed eater", "line trimmer" or "strimmer", is a tool which uses a flexible monofilament line instead of a blade for cutting grass and other plants near objects, or on steep or irregular terrain. Large string trimmers, used for cutting roadside grass in large areas, are often heavy enough to require two hands to operate, and some are even fitted with a harness enabling the user's torso to bear some of their weight. These very large trimmers are often referred to as brush cutters. Brush-cutter types are usually made so that a metal blade can be attached instead of the "string" (or monofilament). A metal blade enables cutting heavier woody brush.

A pole hedge trimmer is a machine which is similar to the string trimmer and is used for trimming (cutting, pruning) hedges or solitary shrubs (bushes). A pole hedge trimmer differs from a string trimmer in that the cutting mechanism comprises comb shaped knive protectors co-operating with corresponding knives configured to move backwards and forwards and being driven by the drive shaft.

The trimmer according to the present invention comprises a motor housing, a shaft tube enclosing a drive shaft, a front handle being provided at the shaft tube, an electric motor as well as a cutting unit. The shaft tube which carries the front handle comprises a portion which has a smaller diameter than the rest of the shaft tube. The portion which has a smaller diameter than the rest of the shaft tube is in the present invention referred to as the "smaller diameter shaft tube portion".

Since the smaller diameter shaft tube portion has a smaller diameter than the rest of the shaft tube, the part of the front handle which enclose the smaller diameter shaft tube portion have the smallest possible diameter. Since the part of the front handle which enclose the smaller diameter shaft tube portion has the smallest possible diameter, the front handle will fit the hand of the user and thereby enable the user to grasp the front handle without losing his or her grip during the operation of the trimmer. This technical feature provides safer handling when operating the trimmer and leads to less injuries. Moreover, the front handle will not give rise to discomfort and/fatigue since the user will be able to grasp the front handle properly, i.e. the front handle is ergonomic. Since only a relatively small portion of the shaft tube (and drive shaft enclosed therein) has a smaller diameter, the shaft tube and the drive shaft enclosed therein can't be crushed by compressive forces.

EXAMPLES

It has been unexpectedly discovered that a trimmer which comprises a smaller diameter shaft tube portion provides (i) an ergonomic front handle, (ii) safer operation of the trimmer, and (iii) shaft tube which is comparable in strength to a shaft tube which has the same diameter along the whole shaft tube. The following examples disclose some of the embodiments of trimmers which have ergonomic front handles and safer operations.

Example 1

Example 1 relates to a string trimmer which is a specific embodiment of the present invention. The trimmer 1 may comprises as illustrated in FIG. 1:
 a. a motor housing 2 having
   i. a front portion 3, a rear portion 4, a top portion 5, a bottom portion, two first side portions,
 b. shaft tube 14 and a drive shaft (not visible) enclosed in said shaft tube 14,
 c. a cutting unit 9 protruding from the distal portion of the shaft tube 14, wherein a shield 45 is configured to be proximal to the cutting unit 9,
 d. an electric motor for driving the cutting unit 9, wherein said motor is contained in the motor housing 2 of the trimmer,
 e. a hand graspable front handle 12 which extends longitudinally from the front portion 3 of the motor housing 2 towards the cutting unit 9, wherein the front handle 12 encloses the portion of the shaft tube 14 which is proximal to the motor housing 2,
 f. a bumper 13 which extends longitudinally at the bottom portion of the motor housing, wherein the bumper may optionally be used as a hand graspable rear handle, g. a loop handle 20 located on the shaft tube, wherein the loop handle 20 preferably extends transversely from one side of the shaft tube to the other side of the shaft tube 14, and wherein the loop handle is preferably configured to be on the portion of the shaft tube which is proximal to the front handle,
h. a J-handle 40 located on the shaft tube, wherein the J-handle preferably extends perpendicularly (i.e. extends in the latitudal direction) from the shaft tube, wherein the J-handle is preferably configured to be on the portion of the shaft tube which is proximal to the front handle, wherein the J-handle is preferably connected to the loop handle,
i. a trigger 50 for accelerating the cutting mechanism of the cutting unit 9, and
j. a power source 30.

Figure 3:
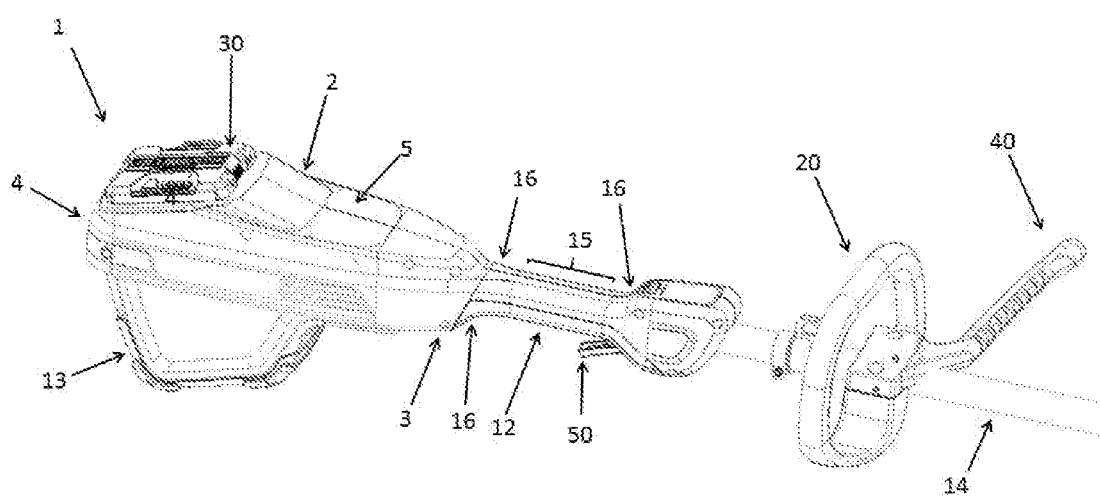
FIG. 3 is a close-up perspective view of the trimmer illustrated in FIG. 1.

In the embodiment shown in FIGS. 1 and 3, the power source 30 is a battery pack. However, a fuel-cell or solar panel may also be used as a power source (either alone or in combination with other power sources). Alternatively, the trimmer may also be connected to a power source via a power cord.

Figure 2:
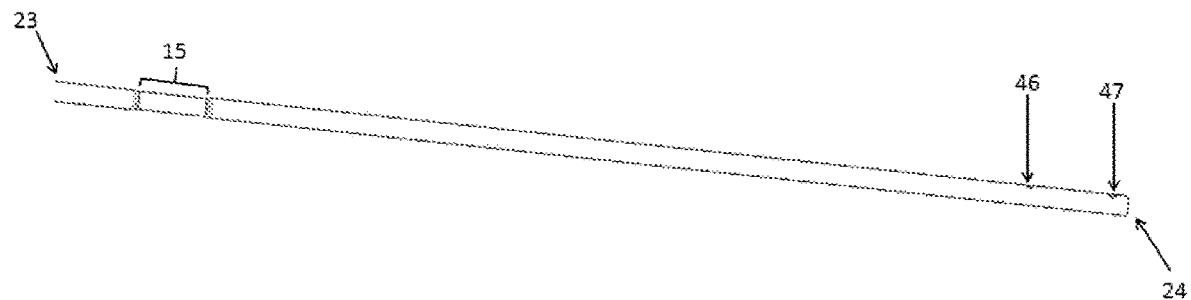
FIG. 2 is a perspective view of a shaft tube according to the present invention.

As illustrated in detail in FIG. 2, the part of the shaft tube 14 which carries the front handle 12 comprises a portion which has a smaller diameter 15 than the rest of the shaft tube 14. The portion which has a smaller diameter than the rest of the shaft tube is in the present invention referred to as the "smaller diameter shaft tube portion 15".

The shaft tube has a proximal portion 23 and a distal portion 24. The proximal portion may be partially in the motor housing 2 and may be directly or indirectly connected to the motor. The distal portion 24 is connected to a cutting unit (which is not shown in FIG. 2 but is shown in FIG. 1 as cutting unit 9) preferably via connection points such as a first connection point 47. There may also be a second connection point 46 which is preferably used for attaching a shield (which is not shown in FIG. 2 but is shown in FIG. 1 as shield 45).

The smaller diameter shaft tube portion 15 can have a length ranging from 3 cm to 20 cm, preferably 5 cm to 18 cm, more preferably 7 cm to 15 cm, and most preferably 9 cm to 13 cm.

The diameter of the smaller diameter shaft tube portion 15 may have a diameter ranging from 14 mm to 50 mm, preferably 20 mm to 30 mm, more preferably 22 to 28 mm, and most preferably about 24 mm to 26 mm. The rest of the shaft tube has a diameter which is at least 1 mm bigger than the diameter of the smaller diameter shaft tube portion 15, preferably 1.5 mm to 2 mm bigger, more preferably 2.1 mm to 2.5 mm bigger, most preferably 2.6 to 3.0 mm bigger.

Since the smaller diameter shaft tube portion 15 has a smaller diameter than the rest of the shaft tube 14, the part of the front handle 12 which enclose the smaller diameter shaft tube portion 15 is configured to have the smallest possible diameter. As illustrated in FIG. 3, the diameter of the part of the handle which encloses the smaller diameter shaft tube portion 15, can be configured to be smaller than the rest of the handle. The parts of the handle which is outside of the smaller diameter shaft tube portion 15 will have a bigger diameter. The parts of the front handle which have bigger diameter (i.e. lies outside of smaller diameter shaft tube portion 15) are indicated with reference numeral 16 in FIG. 3.

The diameter of the part of the front handle 12 which enclose the smaller diameter shaft tube portion 15 may be configured to have a diameter which is at least 0.1 mm bigger than the diameter of the smaller diameter shaft tube portion 15, preferably 1 mm to 10 mm bigger, more preferably 2 mm to 7 mm bigger, most preferably 3 mm to 5 mm bigger.

Since the part of the front handle 12 which encloses the smaller diameter shaft tube portion 15 is configured to have the smallest possible diameter, the front handle 12 will fit the hand of the user and this will enable the user to grasp the front handle without losing his or her grip during the operation of the trimmer. Consequently, this technical feature provides an ergonomic front handle. Moreover, due to the better and more ergonomic grip, the front handle will also provide safer handling when operating the trimmer.

It was unexpectedly discovered that a shaft tube according to the present invention has same strength as a prior art shaft tube which has the same diameter along the whole shaft tube. Hence, in a trimmer according to example 1 and other examples of the present invention, the shaft tube (and drive shaft enclosed within the shaft tube) can't be crushed by compressive forces.

Example 2

Example 2 relates to a trimmer according to Example 1 which does not have a loop handle.

Examples 3 and 4

Examples 3 and 4 relate to a trimmer according to Example 1 and 2, respectively, which does not have a J-handle.

Examples 5, 6, 7 and 8

Examples 5, 6, 7 and 8 relate to a trimmer according to Examples 1, 2, 3 and 4, respectively, in which the cutting unit (9) comprises the cutting mechanism of a hedge trimmer.

In further examples of the invention, Examples 1-8 may be modified by configuring the bumper (13) on the rear portion (4) and/or top portion (5) of the motor housing (2).

In further examples of the invention, the cutting unit (9) comprises the cutting mechanism of a pole saw instead of the cutting mechanism of the hedge trimmer disclosed in Examples 1-4.

REFERENCES

1. Leinert, J. et al. The epidemiology of lawn trimmer injuries in the United States: 2000-2009 (2012) Volume 43, Issue 2, April 2012, Pages 137-139

The invention claimed is:
1. An ergonomic trimmer suitable for cutting vegetation, comprising:
  a motor housing,
  a shaft tube enclosing a drive shaft, a front handle being provided at the shaft tube, proximate the motor housing,
  an electric motor, and
  a cutting unit,
  characterized in that a shaft tube portion, which is a part of the shaft tube that carries the front handle, has a smaller diameter than the rest of the shaft tube, the front handle encloses at least a portion of the smaller diameter shaft tube portion, and the front handle is configured for a user to grasp the front handle around at least a portion of the smaller diameter shaft tube portion.

2. The trimmer according to claim 1, wherein the smaller diameter shaft tube portion has a length ranging from 3 cm to 20 cm.

3. The trimmer according to claim 1, wherein the diameter of the smaller diameter shaft tube portion is ranging from 14 mm to 50 mm.

4. The trimmer according to claim 1, wherein the rest of the shaft tube has a diameter which is at least 1 mm bigger than the diameter of the smaller diameter shaft tube portion.

5. The trimmer according to claim 1, wherein the diameter of the part of the front handle which encloses the smaller diameter shaft tube portion is at least 0.1 mm bigger than the diameter of the smaller diameter shaft tube portion.

6. The trimmer according to claim 1, wherein said cutting unit comprises a cutting mechanism selected from the group consisting of a trimmer blade, a trimmer line, or a saw blade.

7. The trimmer according to claim 1, wherein said trimmer is one of a hedge trimmer, string trimmer, or a pole saw.

8. The trimmer according to claim 1, further comprising at least one of a loop handle, a J-handle, a trigger, and a shield.

9. The trimmer according to claim 1, wherein the electric motor is powered by at least one of a battery pack, a fuel-cell, a solar panel, and power cord.

10. The trimmer according to claim 1, wherein the smaller diameter shaft tube portion has a length ranging from 5 cm to 18 cm.

11. The trimmer according to claim 1, wherein the smaller diameter shaft tube portion has a length ranging from 7 cm to 15 cm.

12. The trimmer according to claim 1, wherein the smaller diameter shaft tube portion has a length ranging from 9 cm to 13 cm.

13. The trimmer according to claim 1, wherein the rest of the shaft tube has a diameter which is 1.5 mm to 2 mm bigger than the diameter of the smaller diameter shaft tube portion.

14. The trimmer according to claim 1, wherein the rest of the shaft tube has a diameter which is 2.1 mm to 2.5 mm bigger than the diameter of the smaller diameter shaft tube portion.

15. The trimmer according to claim 1, wherein the rest of the shaft tube has a diameter which is 2.6 to 3.0 mm bigger than the diameter of the smaller diameter shaft tube portion.

16. The trimmer according to claim 1, wherein the diameter of the part of the front handle which encloses the smaller diameter shaft tube portion has a diameter which is 1 mm to 10 mm bigger than the diameter of the smaller diameter shaft tube portion.

17. The trimmer according to claim 1, wherein the diameter of the part of the front handle which encloses the smaller diameter shaft tube portion is 2 mm to 7 mm bigger than the diameter of the smaller diameter shaft tube portion.

18. The trimmer according to claim 1, wherein the diameter of the part of the front handle which encloses the smaller diameter shaft tube portion is 3 mm to 5 mm bigger than the diameter of the smaller diameter shaft tube portion.

19. An ergonomic trimmer suitable for cutting vegetation, comprising:
 a motor housing,
 a shaft tube enclosing a drive shaft, a front handle being provided at the shaft tube, proximate the motor housing,
 an electric motor, and
 a cutting unit,
 characterized in that a shaft tube portion, which is a part of the shaft tube that carries the front handle, has a smaller diameter than the rest of the shaft tube, wherein the shaft tube is made of a one single piece one part.

20. An ergonomic trimmer suitable for cutting vegetation, comprising:
 a motor housing,
 a shaft tube enclosing a drive shaft, a front handle being provided at the shaft tube, proximate the motor housing,
 an electric motor, and
 a cutting unit,
 characterized in that a shaft tube portion, which is a part of the shaft tube that carries the front handle, has a smaller diameter than the rest of the shaft tube, wherein the shaft tube is a non-telescoping shaft tube.

* * * * *